United States Patent
Wada et al.

(10) Patent No.: US 7,047,142 B2
(45) Date of Patent: May 16, 2006

(54) MONITORING APPARATUS AND MONITORING OBJECT APPARATUS

(75) Inventors: Atsushi Wada, Kyoto (JP); Toshihiko Harada, Kyoto (JP)

(73) Assignee: Arkray, Inc., Kyoto (JP)

( * ) Notice: Subject to any disclaimer, the term of this patent is extended or adjusted under 35 U.S.C. 154(b) by 56 days.

(21) Appl. No.: 10/468,657

(22) PCT Filed: Feb. 25, 2002

(86) PCT No.: PCT/JP02/01641

§ 371 (c)(1),
(2), (4) Date: Nov. 24, 2003

(87) PCT Pub. No.: WO02/066933

PCT Pub. Date: Aug. 29, 2002

(65) Prior Publication Data

US 2005/0033527 A1   Feb. 10, 2005

(30) Foreign Application Priority Data

Feb. 23, 2001   (JP)   ............................. 2001-048475

(51) Int. Cl.
*G06F 19/00* (2006.01)

(52) U.S. Cl. .......................................... 702/35; 702/33
(58) Field of Classification Search ................ 73/432.1; 700/1, 95, 108, 109, 110, 275; 702/33, 35, 702/57, 58, 108, 113, 114, 115, 182, 183, 702/185, 188, 189
See application file for complete search history.

(56) References Cited

U.S. PATENT DOCUMENTS

| | | | |
|---|---|---|---|
| 5,442,545 A | | 8/1995 | Matsui et al. |
| 5,608,657 A | * | 3/1997 | Conway et al. ............. 702/183 |
| 5,619,307 A | | 4/1997 | Machino et al. |
| 5,629,870 A | * | 5/1997 | Farag et al. ................. 700/286 |
| 5,845,272 A | * | 12/1998 | Morjaria et al. ............. 706/50 |
| 6,055,486 A | * | 4/2000 | Minnich et al. ............. 702/56 |
| 6,119,074 A | * | 9/2000 | Sarangapani ................ 702/185 |
| 6,199,018 B1 | * | 3/2001 | Quist et al. ................... 702/34 |
| 6,553,324 B1 | * | 4/2003 | Langmeier et al. ........... 702/35 |
| 6,757,665 B1 | * | 6/2004 | Unsworth et al. ............ 706/15 |
| 6,836,710 B1 | * | 12/2004 | Yamaki ....................... 701/33 |

FOREIGN PATENT DOCUMENTS

| | | |
|---|---|---|
| JP | 63-314609 | 12/1988 |
| JP | 4-287274 | 10/1992 |
| JP | 5-100890 | 4/1993 |
| JP | 5-264470 | 10/1993 |
| JP | 8-23408 | 1/1996 |
| JP | 10-162402 | 6/1998 |
| JP | 2000-194586 | 7/2000 |

* cited by examiner

*Primary Examiner*—John Barlow
*Assistant Examiner*—Douglas N Washburn
(74) *Attorney, Agent, or Firm*—Hamre, Schumann, Mueller & Larson, P.C.

(57) ABSTRACT

A monitoring system for monitoring the state of a monitoring object apparatus so as to detect a foretoken of failure. A host computer (100) of a manufacturer/dealer of a clinical check apparatus (200) receives state data of respective parts from parts sensors (203a, 203b, . . .) of the clinical check apparatus (200) of a user and the received state data is compared to a prediction condition stored in a condition storage block (104) in a state monitoring block (105), thereby detecting a foretoken of failure. The prediction condition includes a condition created in accordance with service life of each of the parts and a condition created upon occurrence of a failure in accordance with transition of the state data prior to the occurrence of the failure.

10 Claims, 7 Drawing Sheets

MONITORING APPARATUS AND MONITORING OBJECT APPARATUS

TECHNICAL FIELD

The present invention relates to a system in which a monitoring device remotely monitors various devices to be monitored through a communication network so as to predict a failure or the like of each of the monitored devices.

BACKGROUND ART

Generally, with respect to various testing devices including clinical testing devices, machine tools or automobiles, or various types of other devices requiring precise operations, manufacturers/dealers of such devices, after delivery of the devices, continuously perform maintenance so that performance of the devices is maintained and safety is secured. Particularly, the occurrence of a failure in a device may hinder an operator of the device from performing a smooth operation or also may cause safety hazards to the operator. Therefore, with a view to improving customer satisfaction, suppressing an increase in maintenance cost and securing safety, it has been of great importance to perform a periodic check of a device and advance replacement of a consumable component and the like so as to prevent a failure from being caused.

Conventionally, it is generally the case that times at which a periodic check and replacement of a component are to be performed are set suitably by a human being based on a past experience rule. Alternatively, there also are cases where such times are set based on life data for each component.

However, in the case where the time for a check/replacement is set based simply on a past experience rule or life data for each component or the like as described above, since there are life variations even among components of the same type due to the differences in usage conditions and the like, the following problem may arise. That is, contrary to expectations, a failure may be caused before the time for a check/replacement, or conversely, a component that still has sufficient life may have to be replaced, thereby resulting adversely in an increase in the maintenance cost, which has been disadvantageous.

DISCLOSURE OF THE INVENTION

With the foregoing in mind, it is an object of the present invention to provide a monitoring system that allows a maintenance check to be performed at an appropriate time with respect to a monitored device by monitoring the state of the device through a communication network so as to detect an indication of an abnormality, thereby allowing the device to achieve a higher normal operating ratio and the suppression of an increase in maintenance cost.

In order to achieve the above-mentioned object, a monitoring device according to the present invention includes a status data receiving part that receives status data representing a status of a monitored device from the monitored device through a communication network, a condition storing part that stores a condition for prediction, and a status monitoring part that compares the status data with the condition for prediction in the condition storing part so as to predict an abnormality. In the device, the condition for prediction includes a condition for prediction created based on a transition of the status data before a point in time at which the abnormality is caused in the monitored device.

In this configuration, with respect to the status data received from the monitored device, upon sequential reception thereof, a comparison is made with the condition for prediction stored in the condition storing part so that an abnormality of the monitored device is predicted. As a condition constituting the condition for prediction, a condition may be used that is created based on a transition of the status data before a point in time at which the abnormality is caused, and thus the occurrence of the abnormality can be predicted more accurately. Thus, a monitoring device can be realized that allows a monitored device to achieve: a higher normal operating ratio compared with a conventional case where a time for a maintenance check is set suitably based on life data of a component or the like; and the suppression of an increase in maintenance cost to be incurred in the case where a maintenance service is performed by a manufacturer/dealer or the like of the monitored device.

Preferably, in the monitoring device, the condition for prediction thus created is a condition created based on transitions of the status data with a common change pattern among transitions of the status data that are observed in at least two monitored devices in which a common abnormality is caused.

For example, in the case where an accidental abnormality is caused, a change pattern of the status data obtained right before the occurrence of the abnormality may not necessarily provide a reliable indication of the abnormality. The use of a condition for prediction created based on such a change pattern even may result adversely in decreased accuracy in predicting an abnormality. Therefore, as in the above-mentioned configuration, a condition for prediction is created based on a common change pattern obtained in the case where a common abnormality is caused, and thus a general condition for prediction used to detect an indication of an abnormality can be set. This allows an abnormality to be predicted more accurately.

Preferably, the monitoring device further includes a data storing part that accumulates the status data received from the monitored device, and an abnormality analyzing part that creates the condition for prediction based on the transition of the status data before the point in time at which the abnormality is caused using the status data accumulated in the data storing part and has the condition for prediction stored in the condition storing part.

According to this configuration, the abnormality analyzing part creates a condition for prediction based on status data received from a monitored device in actual operation by a user and has the condition for prediction stored in the condition storing part. Thus, a condition for prediction can be created objectively, and it also is possible to save human time and effort to create a condition for prediction.

Preferably, in the monitoring device, the condition for prediction further includes a condition for prediction created based on life data of a component of the monitored device.

According to this configuration, a condition for prediction created based on a transition of status data when an abnormality actually is caused and a condition for prediction created based on life data of a component are used in combination. Thus, an abnormality that can be caused due to the wearing out of a component can be predicted more accurately, thereby allowing a maintenance check of a monitored device to be performed at a more appropriate time.

Preferably, in the monitoring device, the status data includes outputs of various types of sensors that are provided in the monitored device, and the condition for prediction includes a condition for prediction corresponding respectively to the outputs of the various types of sensors.

According to this configuration, monitoring is performed based on various types of status data, and thus a status of a monitored device can be judged more properly, thereby allowing an abnormality to be predicted even more accurately.

Preferably, the monitoring device includes a communication part that transmits a notification that an abnormality is predicted by the status monitoring part to the monitored device through the communication network. Furthermore, more preferably, the communication part transmits a direction on how to correct the abnormality.

These configurations allow a user of a monitored device to take proper actions.

In the case where the monitored device includes a light source, and a light amount of the light source is output as the status data, in the monitoring device, a condition for prediction used to predict an abnormality of the light source may be that the tendency of the status data corresponding to the light amount of the light source is turned toward an increase in value, or that a change rate of a value of the status data corresponding to the light amount of the light source deviates from a predetermined range.

That is, a light amount of a light source may increase temporarily or become unstable before an abnormality such as breaking of a lamp or the like is caused in the light source. Thus, the above-mentioned condition for prediction is used, thereby allowing an abnormality of a light source in a monitored device to be detected more accurately.

Furthermore, in the case where the monitored device includes a component that is driven by a pulse motor, and the number of pulses of the pulse motor driving the component is output as the status data, in the monitoring device, a condition for prediction used to predict an abnormality of the component may be that a value of the status data corresponding to the number of pulses of the pulse motor deviates from a predetermined range of the number of pulses.

For example, in the case where the friction resistance or the like of a component driven by a pulse motor is increased for some reason, a loss of synchronization may be caused in the pulse motor, resulting in requiring a larger number of pulses for the component to perform a predetermined operation than in a normal case. Thus, the above-mentioned condition for prediction is used, thereby allowing an abnormality of such a component in a monitored device to be detected more accurately.

Preferably, in the monitoring device, the monitored device includes a component that performs a predetermined operation repeatedly in the case where the predetermined operation has failed to be completed successfully, the number of repetitions of the predetermined operation performed till successful completion is output as the status data, and a condition for prediction used to predict an abnormality of the component includes that a value of the status data corresponding to the number of repetitions becomes higher than values in a predetermined range. This allows an abnormality of such a component in a monitored device to be detected more accurately. In order to achieve the above-mentioned object, a monitored device according to the present invention is a monitored device that is monitored by any of the above-mentioned monitoring devices and includes a sensor part that outputs the status data and a communication part that transmits the status data to the monitoring device through a communication network.

According to this configuration, status data is transmitted to a monitoring device through a communication network, and thus it is made possible to receive an abnormality predicting service by remote monitoring. This allows a monitored device to be provided that has a high normal operating ratio and can be reduced in maintenance cost.

Preferably, in the monitored device, the communication part transmits the status data immediately after the status data is output from the sensor part. This provides an advantage of allowing a status of a monitored device to be kept always up to date in a monitoring device.

Preferably, in the monitored device, a memory part that accumulates the status data output from the sensor part is provided, and the communication part transmits the status data accumulated in the memory part at a predetermined timing. This provides an advantage of allowing the transmission efficiency of data to be improved.

In order to achieve the above-mentioned object, a first program according to the present invention is a program that allows a computer to perform a process characterized by: receiving status data representing a status of a monitored device from the monitored device; comparing a condition for prediction including a condition created based on a transition of the status data before a point in time at which an abnormality is caused in the monitored device with the status data; and providing to the monitored device a notification that the abnormality is predicted when the status data meets the condition for prediction.

This program is read into a computer so as to be performed, thereby allowing the monitoring device according to the present invention to be realized.

In order to achieve the above-mentioned object, a second program according to the present invention is a program that allows a computer to perform a process characterized by: accumulating status data received from a monitored device in a data storing part; and creating a condition for prediction of an abnormality based on a transition of the status data before a point in time at which the abnormality is caused using the status data accumulated in the data storing part.

This program is read into a computer so as to be performed, thereby allowing the monitoring device according to the present invention to be realized that automatically creates a condition for prediction based on status data obtained from a monitored device in operation.

In order to achieve the above-mentioned object, a third program according to the present invention is a program that is read into a computer mounted in a monitored device monitored by any of the above-mentioned monitoring devices. The third program allows the computer to perform a process characterized by transmitting an output of a sensor part as status data to the monitoring device through a communication network.

This program is read into a computer mounted in a monitored device so as to be performed, thereby allowing the monitored device according to the present invention to be realized.

BEST MODE FOR CARRYING OUT THE INVENTION (Embodiment 1)

Hereinafter, the present invention will be described by way of an embodiment with reference to the appended drawings.

Figure 1:
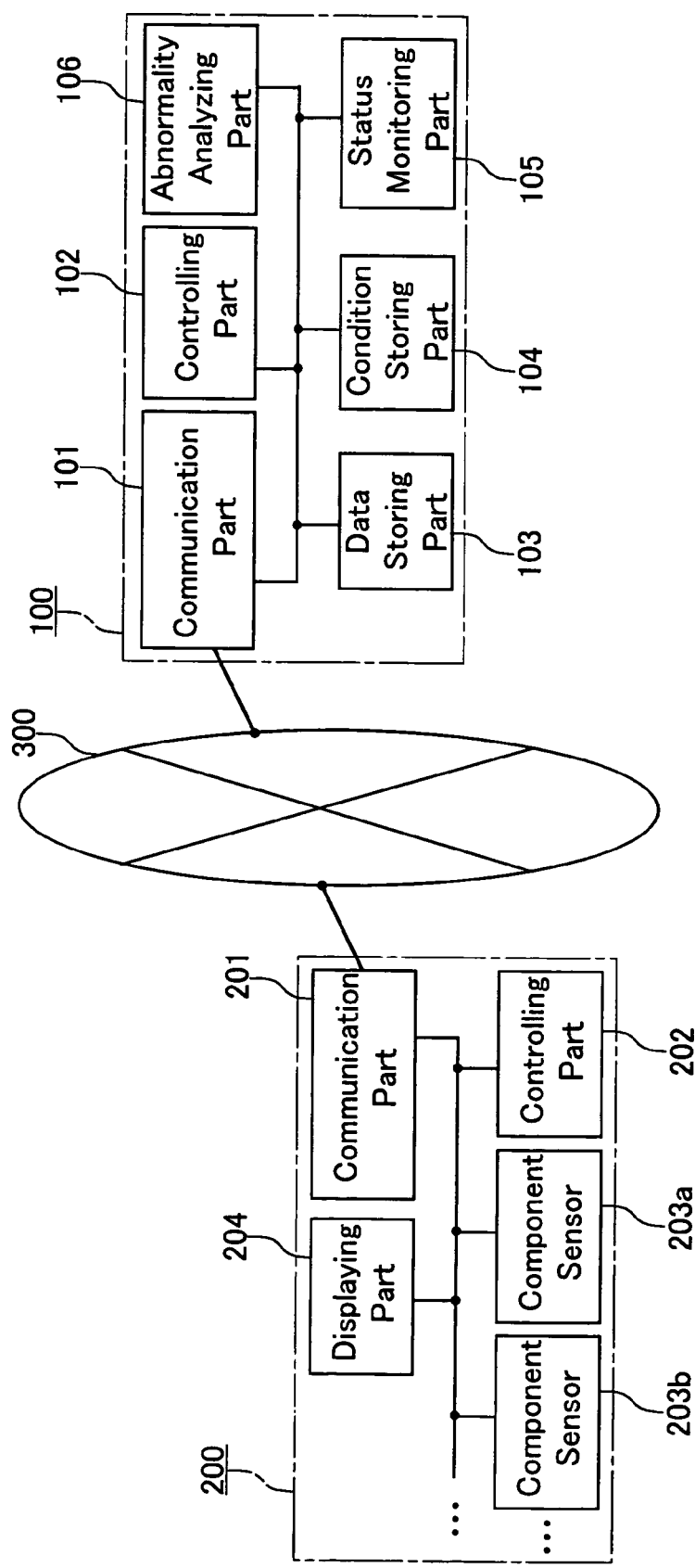
FIG. 1 is a block diagram schematically showing a configuration of a monitoring system according to an embodiment of the present invention.

As shown in FIG. 1, a monitoring system according to this embodiment has a configuration in which a host computer 100 (monitoring device) of a manufacturer/dealer of a device such as a clinical testing device or the like and a clinical testing device 200 (monitored device) that has been delivered to a user by this manufacturer/dealer are connected to each other through a communication network 300 such as the Internet. In FIG. 1, for the sake of simplicity, only one unit of the clinical testing device 200 is shown. However, an arbitrary number of units of the clinical testing devices 200 are connected to the host computer 100.

The communication network 300 is not limited to the Internet mentioned above and can be formed of any communication medium that is capable of bi-directional communication. Through this communication network 300, data representing a status of the device (hereinafter, referred to as status data), an error signal, a trouble signal and the like are transmitted from the clinical testing device 200 to the host computer 100. Further, a data requesting signal, contents of a manual for operating the clinical testing device 200 and the like are transmitted from the host computer 100 to the clinical testing device 200.

In this embodiment, an "error" refers to an operational abnormality attributable mainly to an operational error by a user or the like and does not require repair or the like to be made on the device itself. For example, an "error" is a phenomenon in which a measurement is terminated because no test paper to be used for the measurement has been set. This case does not require repair or the like because an operation returns to normal once the test paper is set by the user. On the other hand, "trouble" refers to an operational abnormality attributable to an abnormality caused in the device and is a phenomenon that requires repair, replacement of a component and the like. The host computer 100 as the monitoring device is to predict the trouble.

As shown in FIG. 1, the host computer 100 includes a communication part 101, a controlling part 102, a data storing part 103, a condition storing part 104, a status monitoring part 105, and an abnormality analyzing part 106.

The communication part 101 transmits such data and the like as described above to and receives the same from the clinical testing device 200 through the communication network 300. The controlling part 102 controls operations of the respective parts of the host computer 100 according to a predetermined program. The data storing part 103 stores status data transmitted from the clinical testing device 200. The condition storing part 104 stores a condition (referred to as a condition for prediction) that appears in the status data and indicates an abnormality. The status monitoring part 105 monitors the status data in comparison with the condition for prediction so as to judge whether or not a maintenance operation or the like needs to be performed with respect to the clinical testing device 200. In the case of trouble, the abnormality analyzing part 106 analyzes a change in the status data that has been caused as an indication of the trouble using the status data obtained right before a point in time at which the trouble is caused.

As shown in FIG. 1, the clinical testing device 200 includes a communication part 201, a controlling part 202, component sensors 203a–203b and the like, and a displaying part 204. In FIG. 1, for the sake of simplification, with respect to the clinical testing device 200, only a block of a control system relevant to the prediction of an abnormality is shown. However, for example, any functional block for achieving the intended purpose of the clinical testing device 200 can be provided.

The communication part 201 transmits such data and the like as described above to and receives the same from the host computer 100 through the communication network 300. The controlling part 202 controls operations of the respective parts of the clinical testing device 200 according to a predetermined program. The component sensors 203a–203b and the like are sensors that are attached respectively to at least components with the possibility of leading to an operational abnormality among constituent components of the clinical testing device 200. The component sensors 203a–203b and the like produce outputs in the form of status data representing a status of each of the at least components. The displaying part 204 displays on a screen, in addition to a message to a user as a prompt and contents of an operation manual transmitted from the host computer 100, a message notifying a user of an error, trouble and the like.

The following description is directed to an operation of this monitoring system in the case where a urine analyzing device is used as the clinical testing device 200.

The urine analyzing device as the clinical testing device 200 sucks a sample (urine) using a nozzle from a spitz tube set in a sample rack and applies the same to a reagent pad of test paper by spotting. Then, the device irradiates light having a predetermined wavelength onto this test paper so as to measure a reflectance of the light, thereby performing a determination for urine sugar, urine protein and the like. Further, the device also has a function of measuring a specific gravity based on a refractive index of light irradiated onto a sample in a sample rack and a function of measuring turbidity using scattered light. The device further includes a conveying part that moves a sample rack in a horizontal direction so that an automatic conveying line can be established between the device and another device, between which a common sample rack is shared, and a plurality of sample racks can be used sequentially.

Thus, as the component sensors 203, the urine analyzing device includes various types of sensors in the respective parts, which are, for example, (1) a sensor that counts the number of times of use of a syringe pump for allowing the nozzle to perform a sucking operation and outputs the number thus obtained, (2) a sensor that determines an operation time of an air pump (diaphragm pump) and outputs the time thus obtained, (3) a sensor that measures a pressure in a drainage passage and outputs a value of the pressure thus obtained, (4) a sensor that measures a light amount of a light source lamp for measurement and outputs the light amount thus obtained, and (5) a sensor that measures a frictional resistance of the sample rack conveying part and outputs the friction resistance thus obtained and the like.

The timing at which these pieces of data are output respectively from the sensors should be set arbitrarily according to the respective properties of the components. Further, one component may be provided with two or more types of the component sensors 203 so that two or more types of status data can be detected. For example, in the above-mentioned syringe pump, in addition to the sensor that counts the number of times of use, a sensor further may be provided as the component sensor 203, which detects, with respect to a pulse motor driving a syringe to move vertically, the numbers of driving pulses obtained respectively when the syringe moves upwardly and when the syringe moves downwardly.

The pieces of data (status data) output respectively from the above-mentioned component sensors 203 are transmitted as required from the communication part 201 to the host computer 100 through the communication network 300 under the control of the controlling part 202. Then, the pieces of data are stored in the data storing part 103.

The status data may be transmitted from the clinical testing device 200 to the host computer 100 each time the status data is output from each of the component sensors 203. Alternatively, a memory (not shown) that temporarily stores the status data may be provided in the clinical testing device 200 so that upon accumulation of a certain amount of the status data, the accumulated set of status data may be transmitted. The former method has an advantage of allowing a status of the clinical testing device 200 to be kept always up to date in the host computer 100. The latter method has an advantage of allowing the transmission efficiency of data to be improved.

In the host computer 100, the status monitoring part 105 compares the status data stored in the data storing part 103 with the condition for prediction stored in the condition storing part 104 so as to judge a status of the clinical testing device 200.

As an initial value of a condition for prediction, a condition based on life data of each component or the like is set in the condition storing part 104. For example, with respect to the status data from the syringe pump that is obtained as described above in Item (1), it is set as an initial value of the condition for prediction that "the number of times of use reaches 10,000". Further, with respect to the status data from the air pump that is obtained as described in Item (2), for example, it is set as such an initial value that "the operation time reaches 5,000 hours". With respect to the status data from the drainage passage that is obtained as described in Item (3), for example, it is set as such an initial value that "a decrease in pressure in the passage is less than 60 kPa after an elapse of 5 seconds from the start of pump driving". With respect to the status data from the light source lamp for measurement that is obtained as described in Item (4), it is set as such an initial value that "a light amount of the lamp becomes not more than 70% of an initial value". With respect to the status data from the sample rack conveying part that is obtained as described in Item (5), it is set as such an initial value that "a friction becomes not less than a certain value (N)".

Furthermore, in the condition storing part 104, a situation handling method also is stored in relation to each of these conditions for prevention. For example, regarding the case where the above-mentioned condition for prediction for the syringe pump with respect to Item (1) is met, "greasing the syringe" and "replacing an O-ring" are stored as the situation handling methods. Further, regarding the case where the condition for prediction for the air pump with respect to Item (2) is met, "replacing the pump" is stored as such a situation handling method. Regarding the case where the condition for prediction for the drainage passage with respect to Item (3) is met, "clearing clogging inside the passage, or confirming a deterioration in the ability of the pump so as to replace the pump if necessary" is stored as such a situation handling method. Regarding the case where the condition for prediction for the light source lamp with respect to Item (4) is met, "replacing the lamp" is stored as such a situation handling method. Regarding the case where the condition for prediction for the sample rack conveying part with respect to Item (5) is met, "cleaning a portion in which friction is caused" is stored as such a situation handling method.

The status monitoring part 105 compares the status data from the clinical testing device 200 with the condition for prediction. If the status data meets the condition for prediction, the status monitoring part 105 transmits to the clinical testing device 200 through the communication part 101 and the communication network 300, for example, a message for giving a direction on the situation handling method stored in relation to the condition for prediction in the condition storing part 104 along with a message for making an alarm indicating an extremely high possibility of the occurrence of an abnormality. In the clinical testing device 200, upon the reception of these messages and the like by the communication part 201, the displaying part 204 displays the situation handling method on a screen under the control of the controlling part 202. Thus, a user of the clinical testing device 200 is allowed to, for example, perform self-handling of the situation according to the message displayed on the screen or the like. Alternatively, in the case where the self-handling does not work, the user is allowed to, for example, request dispatching of maintenance personnel.

However, in practice, under the influence of, for example, a state of use, a maintenance status, or variations in conditions under which a component is manufactured, in some cases, an abnormality is caused before the status data meets the condition for prediction set initially. Conversely, in other cases, an abnormality is not caused even after a point in time at which the status data meets the condition for prediction.

With this in view, as will be described hereinafter, when an abnormality actually is caused, the host computer 100 according to this embodiment refers to the status data stored in the data storing part 103. Then, the host computer 100 creates a new condition for prediction based on a change pattern of the status data obtained right before a point in time at which the abnormality is caused and adds the same in the condition storing part 104. After this, the status monitoring part 105 compares the condition for prediction set initially as well as the condition for prediction thus added with the status data so as to monitor the clinical testing device 200. If the status data meets any of the conditions for prediction, the status monitoring part 105 transmits the above-mentioned messages or the like, i.e., for example, the message for creating an alarm and the message for giving a direction on the situation handling to the clinical testing device 200.

The following description is directed to a method of setting a new condition for prediction when an abnormality is caused. The method is set based on a change pattern of status data obtained right before the abnormality is caused. The description specifically illustrates an example in which in the above-mentioned urine analyzing device, and breaking is caused in the light source lamp for measurement.

Figure 2:
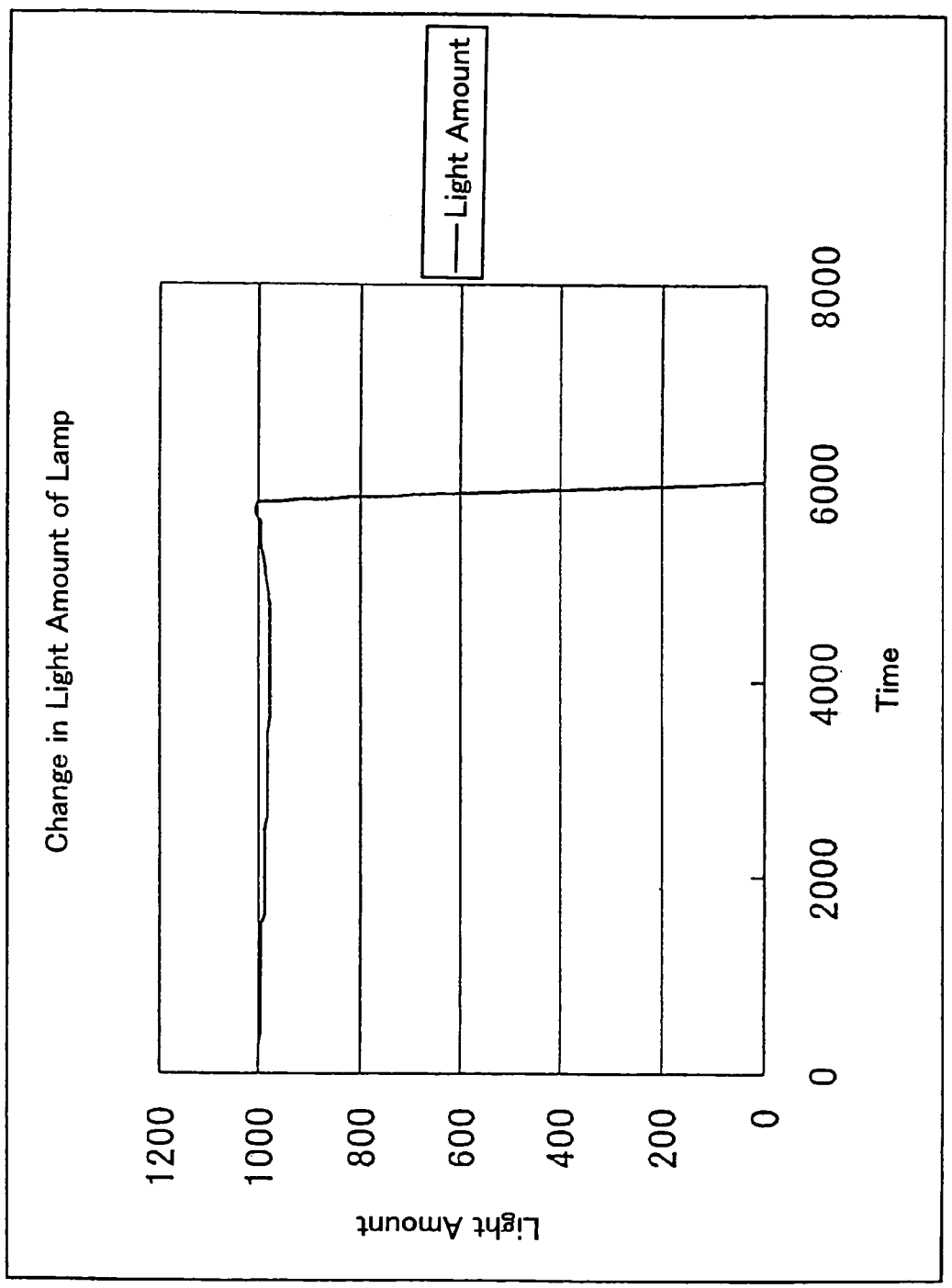
FIG. 2 is a graph showing an example of a change pattern of status data of a clinical testing device monitored in the monitoring system, which is used as a basis on which a condition for prediction is created.

FIG. 2 is a graph showing a transition of status data from the light source lamp for measurement, namely, a light amount of the lamp that is measured by any of the component sensors 203 and transmitted to the host computer 100. As shown in the figure, after an elapse of about 6,000 hours from the start of lamp use, breaking was caused in the lamp.

When breaking is caused in the light source lamp, the component sensor 203 for the lamp detects the occurrence of trouble, i.e. "breaking in the light source lamp" and outputs a trouble signal allotted beforehand to this type of trouble. This trouble signal is transmitted to the host computer 100 through the communication part 201 and the communication network 300.

In the host computer 100, upon the reception of this trouble signal by the communication part 101, under the control of the controlling part 102, the abnormality analyzing part 106 extracts from the data storing part 103 status data obtained during a predetermined period preceding a point in time at which this trouble signal is received. Then, the abnormality analyzing part 106 analyzes the status data thus extracted, extracts a change pattern as an indication of an abnormality, and sets a new condition for prediction.

For example, in the status data shown in FIG. 2, the light amount of the lamp as the status data is decreased gradually after the start of lamp use. However, as can be seen from the figure, the light amount exhibits a tendency that turns toward an increase before the breaking is caused in the lamp. Therefore, as a new condition for prediction, it is added in the condition storing part 104 that "the light amount of the lamp is increased". Thus, after this, with respect to the light amount of the lamp as the status data of the light source lamp, when either of the condition that "the light amount of the lamp becomes not more than 70% of the initial value" and the condition that "the light amount of the lamp is increased" is met, a message for making an alarm or the like is issued.

Figure 3:
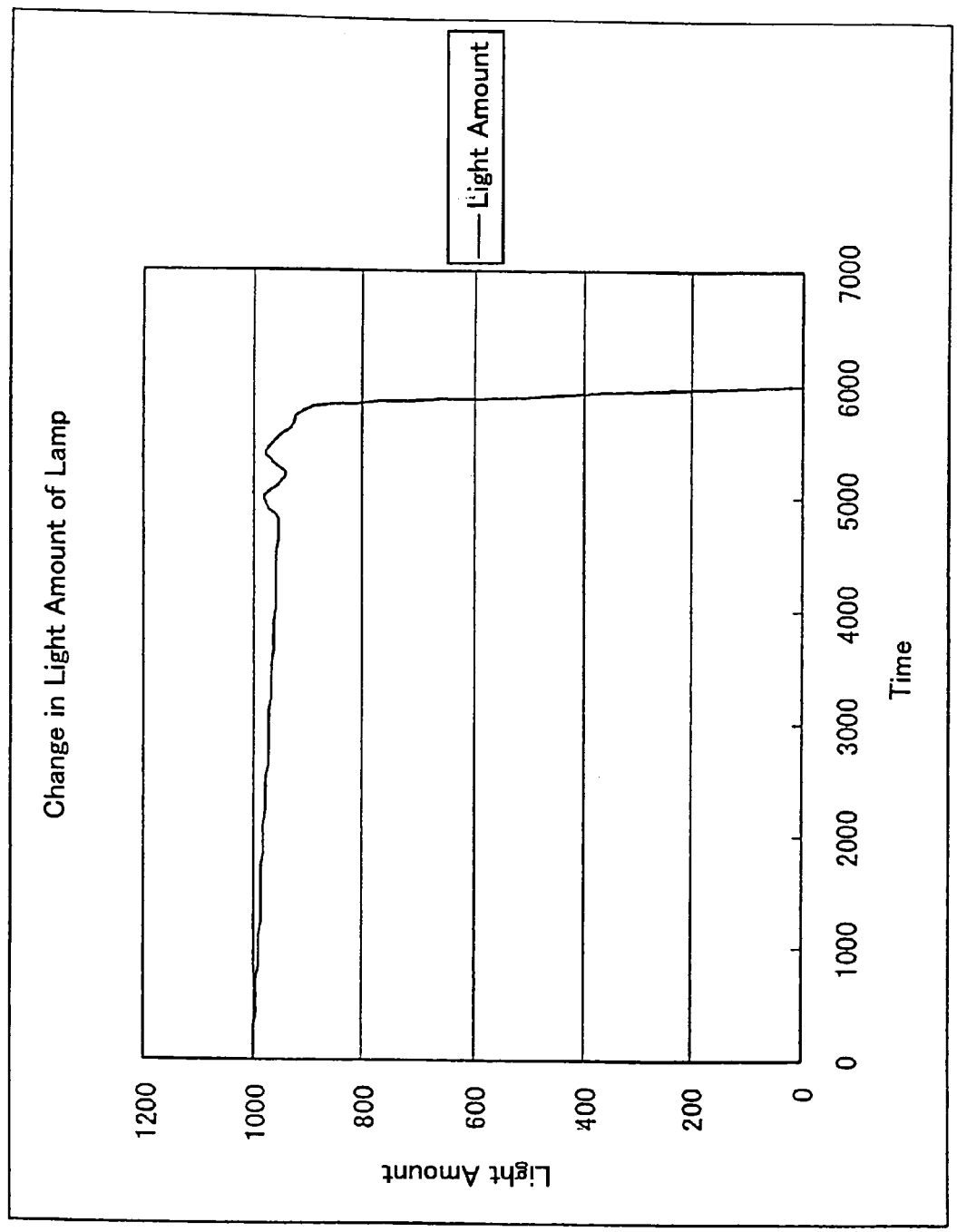
FIG. 3 a graph showing another example of the change pattern of the status data of the clinical testing device, which is used as the basis on which the condition for prediction is created.

Furthermore, for example, in the case where the light amount of the lamp has a change pattern as shown in FIG. 3, as can be seen from the figure, the light amount is unstable before the breaking is caused in the lamp. Therefore, in this case, for example, it may be newly added as a condition for prediction in the condition storing part 104 that "the change rate of the light amount of the lamp deviates from a predetermined range".

Furthermore, with respect to the above-mentioned syringe pump, for example, in the case where an abnormality was caused in vertical driving of the syringe before the condition for prediction set initially was met, namely before the number of times of use reached 10,000, an analysis was made, with respect to the pulse motor driving the syringe to move vertically, on the numbers of driving pulses obtained respectively when the syringe moved upwardly and when the syringe moved downwardly. As a result, it was revealed that a deviation of 4 pulses or more was generated right before a point in time at which the abnormality was caused. In this case, it should be added as a new condition for prediction in the condition storing part 104 that "the difference between the numbers of driving pulses obtained respectively when the syringe of the pulse motor moves upwardly and when the syringe moves downwardly becomes 4 or more".

As described above, according to the configuration of this embodiment, a condition for prediction based on life of a component or the like is set initially in the condition storing part 104. In the case of the actual occurrence of an abnormality, a new condition for prediction is added in the condition storing part 104, which is created based on a change pattern of status data obtained right before a point in time at which the abnormality is caused. This allows the status monitoring part 105 to detect an indication of an abnormality more accurately.

A new condition for prediction based on a change pattern of status data may be created by the abnormality analyzing part 106 according to a predetermined algorithm or may be created and set by a human being based on a change pattern extracted and analyzed by the abnormality analyzing part 106.

(Embodiment 2)

Hereinafter, the present invention will be described by way of another embodiment.

In this embodiment, as an example of the clinical testing device 200, a device is used that is provided with a test strip feeder part (not shown in FIG. 1) supplying a testing part with test strips. The description is directed to a mechanism in which an operational abnormality of this device is predicted by the host computer 100.

Figure 4:
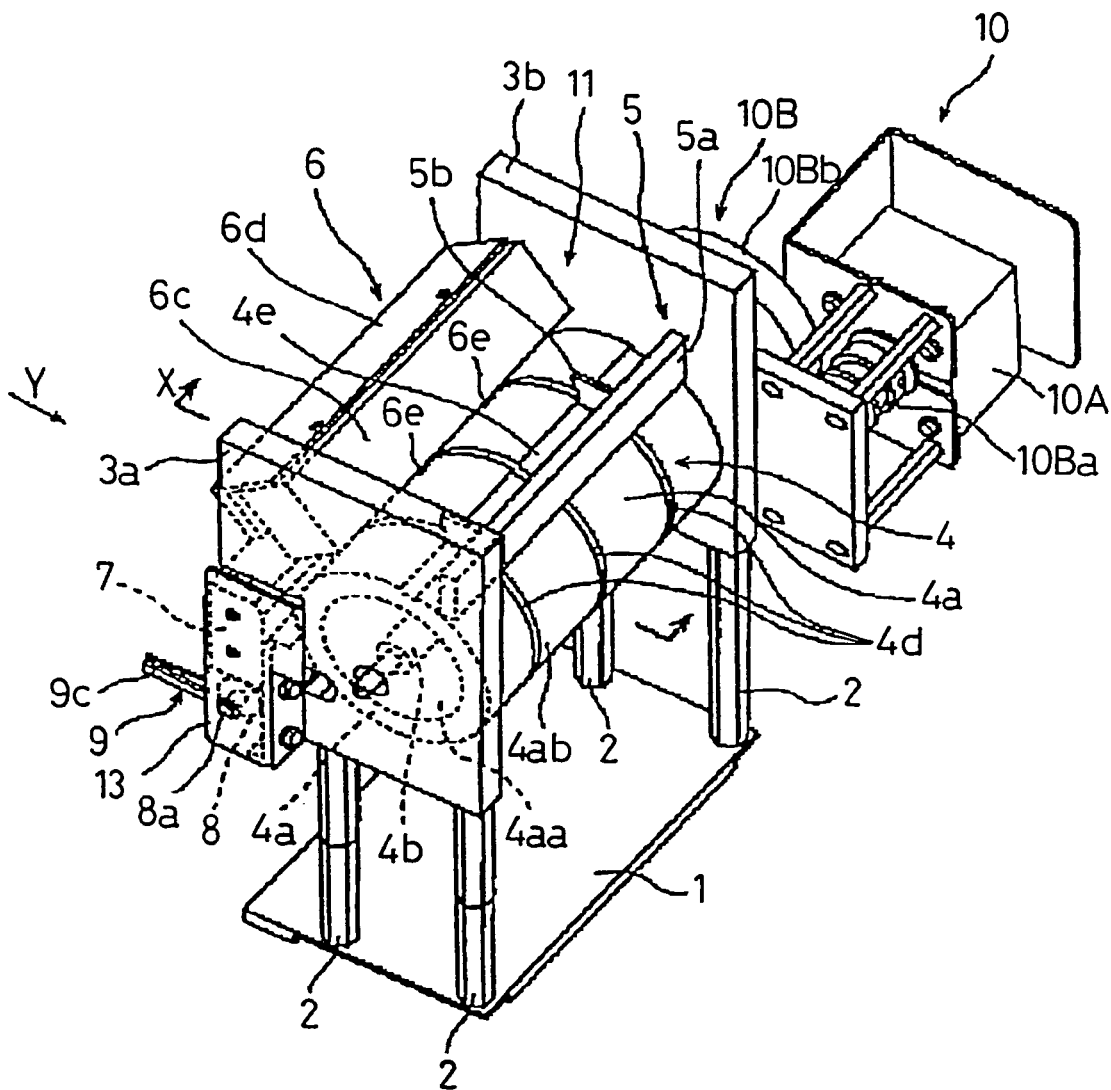
FIG. 4 is a perspective view showing a configuration of a test strip feeder provided in a device as an example of the clinical testing device.

As shown in FIG. 4, a test strip feeder included in the clinical testing device 200 is a mechanism for sequentially supplying a predetermined testing part with test strips one at a time. A test strip is a thin and short strip having one side with a surface on which many different types of reagent pads are disposed.

As shown in FIG. 4, the test strip feeder includes a base 1, supports 2, supporting members 3a and 3b, a rotor 4, a lodging portion 5, a test strip detecting block 6, an inclined cover 7, a drum 8, a base member 9, a driving portion 10, and a drum controlling portion (not shown). The drum controlling portion is formed of a microcomputer or the like.

The supporting members 3a and 3b, the lodging portion 5 and the test strip detecting block 6 form peripheral side walls of a supplying portion 11 in which a plurality of test strips are supplied. The rotor 4 takes out a test strip one at a time from the supplying portion 11 so as to feed it to the drum 8. A photo sensor 6a (see FIG. 6) is incorporated within the test strip detecting block 6. This sensor detects the sides of one test strip fed from the rotor 4 to the drum 8.

A pulse motor 10A for supplying the rotational power to the rotor 4 and the drum 8 is incorporated in the driving portion 10. A driving shaft of the pulse motor 10A is coupled to rotary shafts of the rotor 4 and the drum 8 through a driving transmitting system 10B including a belt, pulleys 10Ba and 10Bb and the like, a part of which is not shown in the figure.

In this test strip feeder, as the component sensors 203 shown in FIG. 1, various types of sensors including the photo sensor 6a are provided to transmit status data of each component to the host computer 100.

Figure 5:
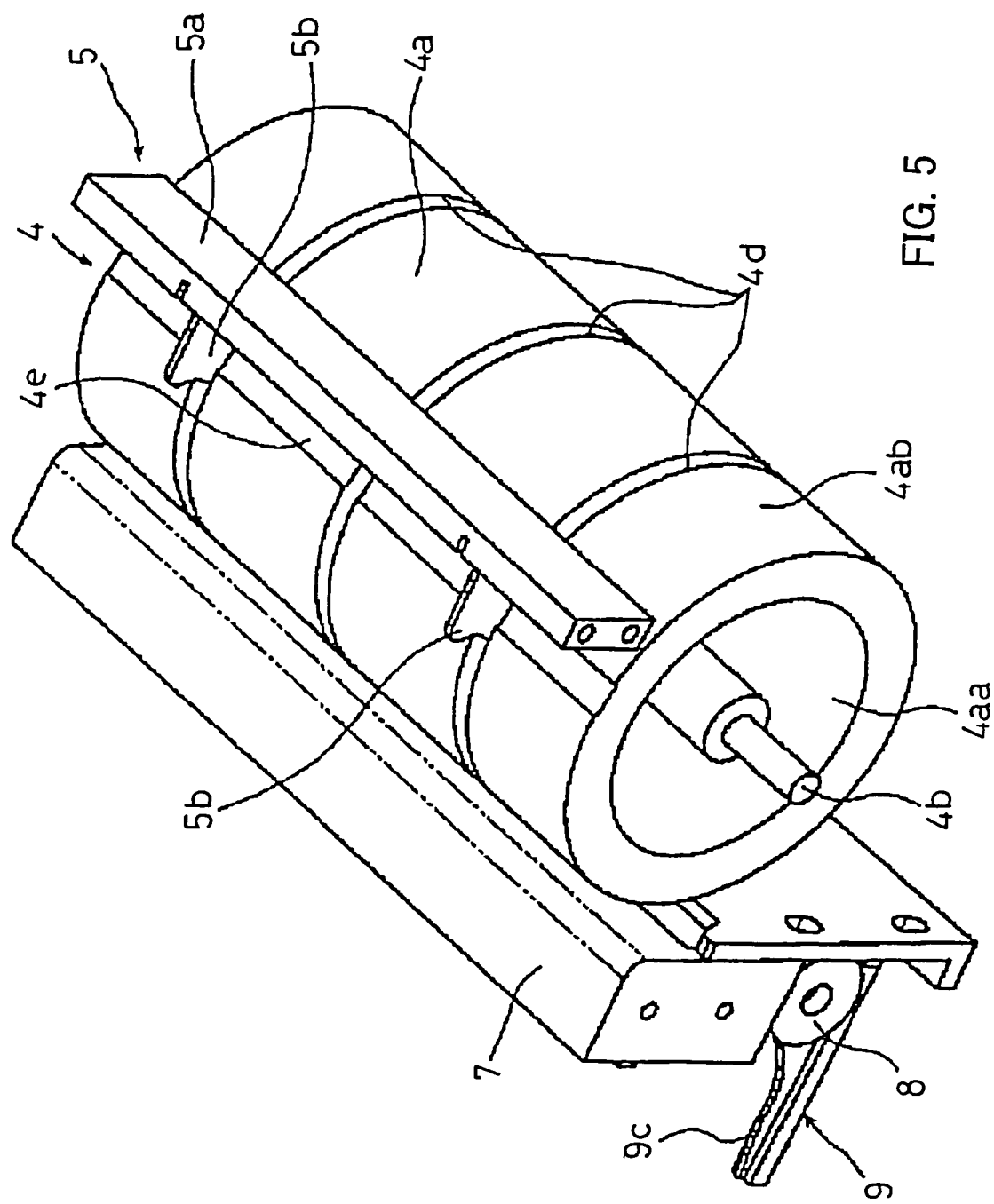
FIG. 5 is an enlarged perspective view showing a rotor and the periphery thereof shown in FIG. 4.
Figure 6:
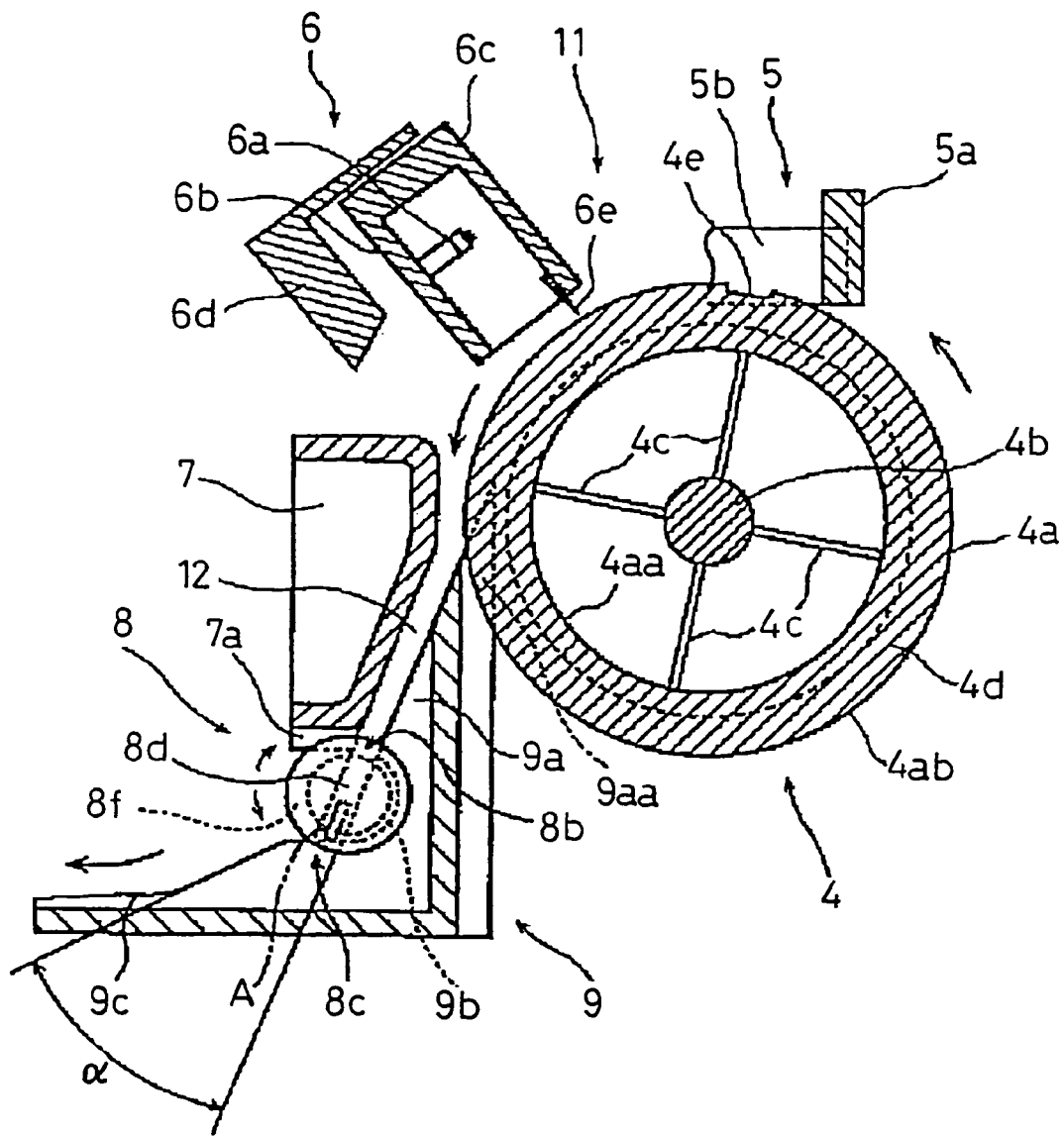
FIG. 6 is a cross sectional view taken on line X—X of FIG. 4.

FIG. 5 is an enlarged perspective view showing the rotor 4 and the periphery thereof shown in FIG. 4. FIG. 6 is a cross sectional view taken on line X—X of FIG. 4. As shown in FIGS. 4 to 6, the rotor 4 is formed so as to have an external column-like shape that is longer than wide as a whole and constituted schematically of an outer peripheral portion 4a, a rotary shaft 4b and spoke members 4c. The outer peripheral portion 4a is formed so as to have a cylindrical shape that is longer than wide and a dimension in a longitudinal direction that corresponds substantially to a longitudinal length of a test strip. While being positioned at a center inside the outer peripheral portion 4a, the rotary shaft 4b is coupled to an inner side face 4aa of the outer peripheral portion 4a through the spoke members 4c. Each end portion of this rotary shaft 4b is inserted into a through hole provided at a predetermined portion of each of the supporting members 3a and 3b. The rotor 4 is set so as to be rotatable while being supported by the shaft between the supporting members 3a and 3b.

Meanwhile, concave portions 4d in the form of a plurality of lines of deep grooves are formed on an outer side face 4ab of the outer peripheral portion 4a so as to make a round along a rotational direction. Further, a groove portion 4e that is longer than wide is formed on the outer side face 4ab so that one test strip can be fit in the groove portion 4e along a longitudinal direction orthogonal to the rotational direction.

Under the control of the driving portion 10, the rotor 4 performs a reciprocating rotational motion between a position (initial position) at which the groove portion 4e is positioned below the lodging portion 5 and a position (judging position) that allows the photo sensor 6a to judge whether or not a test strip is present in the groove portion 4e. A rotation angle is controlled based on the number of driving pulses of the pulse motor 10A, and a rotational position of the rotor 4 is detected by the photo sensor 6a. That is, when the pulse motor 10A is driven by a predetermined number of pulses (for example, 500 pulses) so as to rotate the rotor 4 from the initial position, if it is detected by the photo sensor 6a that the rotor 4 is in the judging position, it is judged that the rotor 4 operates normally.

When a plurality of test strips are supplied by a user in the supplying portion 11 while being aligned in a longitudinal direction, as shown in FIG. 3, the rotor 4 starts to rotate in a counterclockwise direction from the initial position. At this time, one of the test strips that is positioned at the bottom of the supplying portion 11, while being fit in the groove portion 4e of the rotor 4, is moved in a direction of the test strip detecting block 6 as the rotor 4 rotates. In this case, the plurality of test strips supplied in the supplying portion 11 are piled up on the outer side face 4ab of the rotor 4 including the groove portion 4e. When the groove portion 4e is moved to a position where the groove portion 4e faces the test strip detecting block 6, the test strips piled up in the groove portion 4e are sorted into only one strip by a partitioning plate 6e.

The rotor 4 rotates further, and thus the one test strip fit in the groove portion 4e, while being integrated with the groove portion 4e, is passed through the test strip detecting block 6 and reaches the judging position. At this position, the photo sensor 6a of the test strip detecting block 6 detects whether or not a test strip is fit in the groove portion 4e. In the case where the photo sensor 6a detects a test strip, namely, when it is confirmed that the rotor 4 has rotated to the judging position, the driving portion 10 drives the pulse motor 10A further by a predetermined number of pulses so that the rotor 4 is rotated further in the counterclockwise direction. Thus, the test strip is ejected to an inclined passage 12.

If it is not detected by the photo sensor 6a that the rotor 4 has rotated to the judging position even when the rotor 4 has been rotated by 500 pulses, conceivably, the reason is that the test strip is stuck between the rotor 4 and the partitioning plate 6e, and thus the rotor 4 is hindered from rotating.

In this case, in order to remove the stuck test strip, as described above, the driving portion 10 once drives the rotor 4 back to the initial position and restarts a rotational operation. The component sensor 203 provided in the driving portion 10 outputs to the host computer 100, as status data, the number of times (number of trials) this operation is performed until one test strip is ejected to the inclined passage 12. In the case where it is not detected that the rotor 4 has rotated to the judging position even when this operation is repeated a predetermined number of times (for example, 50 times), a trouble signal representing the occurrence of "test paper jamming" is output from the component sensor 203 of the driving portion 10 and transmitted to the host computer 100 through the communication part 201 and the communication network 300.

In the host computer 100, upon the reception of this trouble signal by the communication part 101, under the control of the controlling part 102, the abnormality analyzing part 106 extracts from the data storing part 103 status data obtained during a suitable period preceding a point in time at which this trouble signal is received.

Figure 7:
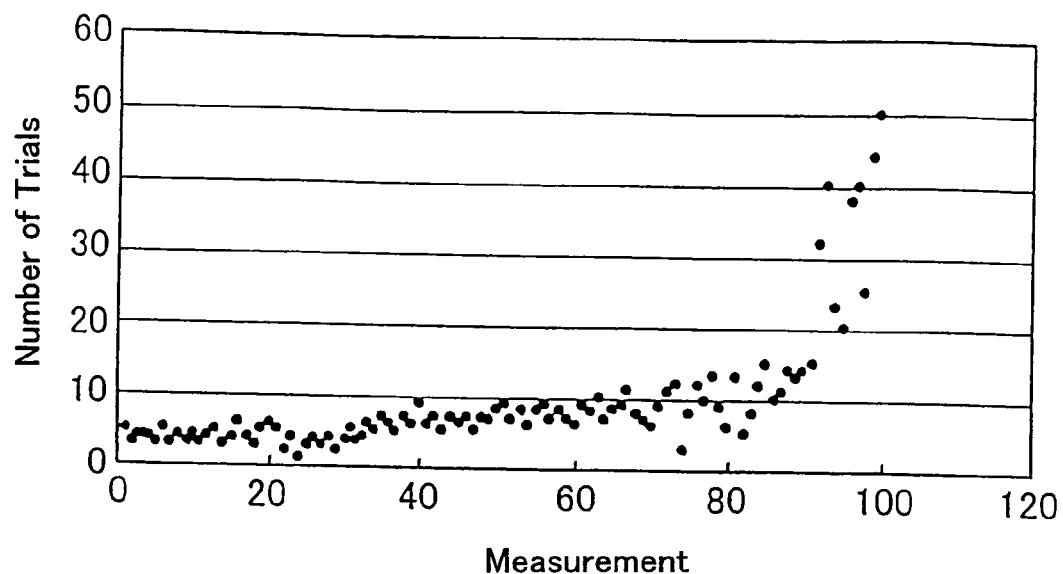
FIG. 7 is a graph showing a change pattern of a set of status data obtained with 100 measurements performed during a time preceding a point in time at which test strip jamming is caused.

Herein, it is assumed that the abnormality analyzing part 106 extracted as status data obtained right before a point in time at which an abnormality was caused, for example, status data obtained in 100 times of measurements performed during a time preceding a point in time at which "test strip jamming" was caused (namely, the number of trials that had been performed so as to take out 100 test strips). A change pattern of the status data is shown in FIG. 7. Further, the abnormality analyzing part 106 extracts from the data storing part 103, status data obtained with 100 measurements performed during a time further preceding the 100 measurements as data at a normal status for comparison with the status data obtained right before the abnormality was caused. A change pattern of this data at the normal status is shown in FIG. 8.

Figure 8:
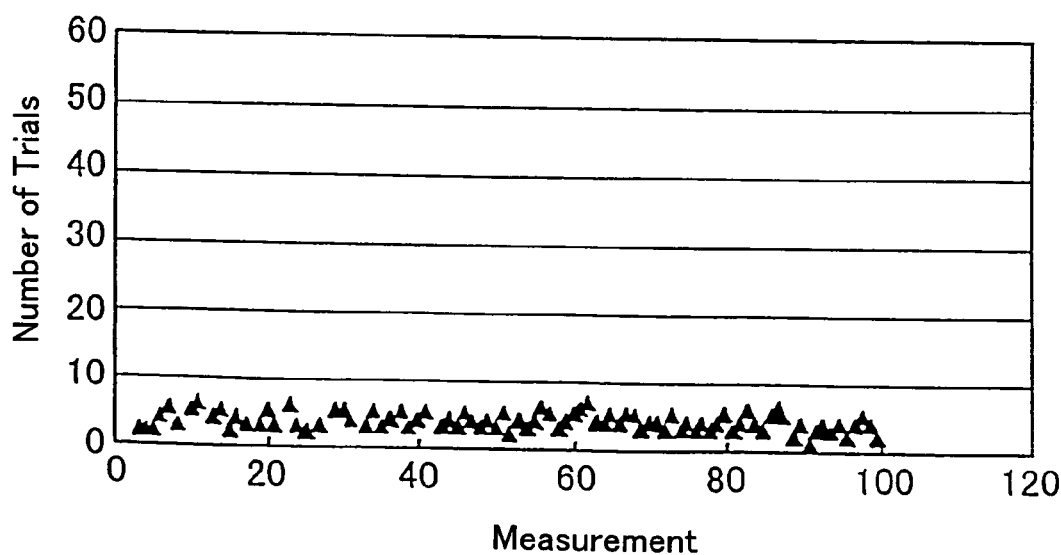
FIG. 8 is a graph showing a change pattern of a set of status data obtained with 100 measurements performed during a time further preceding the 100 measurements shown in FIG. 7.

As can be seen by the comparison between FIG. 7 and FIG. 8, in a normal status (FIG. 8), the number of trials performed until one test strip is removed is 3 to 4 on the average, while right before a point in time at which an abnormality was caused (FIG. 7), the number of trials is increased abruptly to 6 to 10 on the average. Therefore, for example, it is added as a new condition for prediction to the condition storing part 104 that "the average of the number of trials becomes 9 or higher". Thus, after this, the status monitoring part 105 monitors the number of trials as status data based on this condition for prediction, thereby allowing an indication of the occurrence of test strip jamming to be detected.

Furthermore, in the driving part 10, another type of the component sensor 203 also is provided that outputs to the host computer 100, as status data, the number of feed pulses of the pulse motor 10A required to rotate the rotor 4 from the initial position to the judging position. The status data obtained by this component sensor 203 was analyzed by the abnormality analyzing part 106. As a result, it was found that in a normal case, the number of feed pulses required for the rotation from the initial position to the judging position was 500 pulses as described above, while right before a point in time at which the test strip jamming was caused, the number was not less than 560 pulses.

Therefore, it is added further as a new condition for prediction to the condition storing part 104 that "the number of feed pulses of the pulse motor becomes not less than 550 pulses", thereby allowing an indication of the occurrence of test strip jamming to be detected more accurately.

Right before the occurrence of test strip jamming, the number of trials performed is increased or the number of feed pulses of a pulse motor is increased because of the following reason. That is, dust generated from a test strip is stuck to a surface of the rotor 4, the groove portion 4e or the like, so that it becomes more likely that a test strip is stuck between the rotor 4 and the partitioning plate 6e and the rotational friction resistance of the rotor 4 is increased. Thus, preferably, in the case where an indication of the occurrence of test strip jamming is detected, a message for giving a direction to "clean the rotor and the groove portion" is transmitted as a situation handling method from the host computer 100 to the clinical testing device 200. This configuration allows a user of the clinical testing device 200 to take a proper action when there is an indication of the occurrence of test strip jamming, thereby allowing the actual occurrence of trouble, i.e. test strip jamming to be prevented.

In the above description, every time an abnormality was caused, a new condition for prediction was added based on a change pattern of status data. However, for example, in the case where an abnormality is caused accidentally under a particular usage condition or the like, a change pattern of status data obtained right before the occurrence of the abnormality may not necessarily provide a reliable indication of the abnormality. The use of a condition for prediction created based on such a change pattern even may result adversely in decreased accuracy in predicting an abnormality.

Therefore, in the host computer 100, when a common abnormality is caused in each of a plurality of the clinical testing devices 200, status data of each of those clinical testing devices 200 is analyzed, and for example, only if a common change pattern is observed in a predetermined or higher number of the clinical testing devices 200, a new condition for prediction may be created based on the change pattern. Thus, a general condition for prediction used to detect an indication of an abnormality can be set, thereby allowing an abnormality to be predicted more accurately.

In this case, with respect to each of the plurality of the clinical testing devices 200, data (manufacture-related data) including a manufacture lot number, a date of manufacture, and a manufacture lot number of a component used in each part further may be stored in the data storing part 103 or a storing part provided for this manufacture-related data in the host computer 100. Then, in the case where common abnormality data is detected from a plurality of the clinical testing devices 200, the host computer 100 determines manufacture lot numbers of the clinical testing devices 200, in each of which an abnormality is caused, a manufacture lot number of a component used in a part with the abnormality and the like based on the manufacture-related data stored in the data storing part 103 or the like. Moreover, in the case where, for example, a manufacture lot number of a device, a manufacture lot number of a component with an abnormality and the like are common to all or a part of the plurality of the clinical testing devices 200 in each of which the abnormality is caused, the clinical testing device 200 assigned the same manufacture lot number or the clinical testing device 200 using a component assigned the same manufacture lot number as that assigned to a component with the abnormality is determined among the monitored clinical testing devices 200. Thus, with respect to the clinical testing device 200 thus determined, a proper action can be taken so that the occurrence of trouble can be prevented.

The above-mentioned embodiments are not to limit the present invention thereto and can be modified variously within the scope of the invention. For example, in the above description, during the operation of the clinical testing device 200 in actual use by a user, status data was transmitted to the host computer 100 as required, and upon the occurrence of an abnormality, a new condition for prediction was created. However, aside from this configuration, a condition for prediction may be creased based on a change pattern of status data obtained from a manufacturer/dealer of the clinical testing device 200 when an abnormality is caused in the clinical testing device 200 operated on a trial basis and stored in the condition storing part 104 of the host computer 100 so as to be used.

Furthermore, the monitoring device according to the present invention is not limited to a host computer such as the one mentioned above and can be realized by using an arbitrary computer such as a personal computer, a workstation or the like. Further, the monitored device is not limited to a clinical testing device, and an arbitrary device requiring a check and maintenance such as an automobile or the like can be applied thereto. Further, household electrical appliances that do not necessarily require a check and maintenance also may be applied thereto. Moreover, the connection between the monitored device and the communication network is not limited to connection by wire, and mobile communication, and connection by radio such as Home RF, Bluetooth and the like also may be used.

In each of the monitoring systems described in the above-mentioned embodiments, status data are collected from a device in actual use by a user, and a condition for prediction is created based on a change pattern of the status data. On the other hand, for example, a configuration also is possible in which an endurance test or the like is performed by a manufacturer of a clinical testing device or the like using a device for a test that has been extracted suitably from devices on a manufacturing line, and a condition for prediction is created based on status data obtained during this test. Nevertheless, according to the monitoring system of this embodiment, a condition for prediction meeting an actual use environment and usage conditions can be created, and thus an abnormality can be predicted more accurately than in the case of using a condition for prediction obtained on a trial basis.

Moreover, this monitoring system allows a plurality of clinical testing devices and the like to be connected to a monitoring device through a communication network. As described above, a configuration also is possible in which a condition for prediction is created by a manufacturer using a device for a test that has been extracted from devices on a manufacturing line. However, generally, the number of devices that can be used in a test is limited. On the other hand, in the monitoring system according to this embodiment, logically, devices of all users can be monitored, and a condition for prediction can be created based on status data obtained from a plurality of devices. Thus, a more general condition for prediction can be created, thereby allowing an abnormality to be predicted even more accurately.

Furthermore, in the monitoring device of this monitoring system, a new condition for prediction that has been created so as to be suitable is added in a condition storing part as required, and thus the longer an operating period of a system, the more effective the conditions for prediction being accumulated can be, thereby allowing an abnormality to be detected even more accurately. Thus, the following effects can be achieved. That is, the normal operating ratio of a clinical testing device or the like further can be improved, and thus increased satisfaction of users can be achieved, and an increase in maintenance cost also can be suppressed further.

INDUSTRIAL APPLICABILITY

As described in the foregoing discussion, according to the present invention, a state of a monitored device is monitored remotely so that an indication of an abnormality is detected, and thus a monitoring system can be provided in which a maintenance check can be performed at an appropriate time, thereby allowing a monitored device to achieve a higher normal operating ratio and the suppression of an increase in maintenance cost.

The invention claimed is:

1. A monitoring device, comprising:
 a status data receiving part that receives status data representing a status of a monitored device from the monitored device through a communication network;
 a condition storing part that stores a condition for prediction;
 a status monitoring part that compares the status data with the condition for prediction in the condition storing part so as to predict an abnormality,
 wherein the condition for prediction includes a condition for prediction created based on a change pattern of the status data that provides an indication of the abnormality, the status data being obtained before a point in time at which the abnormality is caused in the monitored device;
 a data storing part that accumulates the status data received from the monitored device; and
 an abnormality analyzing part that newly creates the condition for prediction based on a transition of the status data before the point in time at which the abnormality is caused using the status data accumulated in the data storing part and has the condition for prediction stored in the condition storing part,
 wherein when the status data meets either of the condition for prediction newly created by the abnormality analyzing part or the condition for prediction prestored in the condition storing part, the status monitoring part judges that there is a high possibility of occurrence of the abnormality.

2. The monitoring device according to claim 1, wherein the condition for prediction created is a condition created based on transitions of the status data with a common change pattern among transitions of the status data that are observed in at least two monitored devices in which a common abnormality is caused.

3. The monitoring device according to claim 1, wherein the condition for prediction further includes a condition for prediction created based on life data of a component of the monitored device.

4. The monitoring device according to claim 1, wherein the status data includes outputs of various types of sensors that are provided in the monitored device, and
 the condition for prediction includes a condition for prediction corresponding respectively to the outputs of the various types of sensors.

5. The monitoring device according to claim 1, further comprising a communication part that transmits a notification that an abnormality is predicted by the status monitoring part to the monitored device through the communication network.

6. The monitoring device according to claim 5, wherein the communication part transmits a direction on how to correct the abnormality.

7. The monitoring device according to claim 1, wherein the monitored device comprises a component that performs a predetermined operation repeatedly in the case where the predetermined operation has failed to be completed successfully, and a number of repetitions of the predetermined operation performed till successful completion is output as the status data, and
 a condition for prediction used to predict an abnormality of the component includes that a value of the status data corresponding to the number of repetitions becomes higher than values in a predetermined range.

8. The monitoring device according to claim 1, wherein manufacture-related data regarding each of the monitored devices are stored,
 upon detection of occurrence of a common abnormality in a plurality of the monitored devices, the monitoring device refers to the manufacture-related data regarding the plurality of the monitored devices, and
 in the case where there is a piece of the manufacture-related data common to at least part of the plurality of the monitored devices, the monitoring device determines the monitored devices, each applying to the piece of the manufacture-related data, other than the at least part of the plurality of the monitored devices.

9. The monitoring device according to claim 8, wherein the manufacture-related data includes at least one piece of data selected from the group consisting of: a manufacture lot identifier of a monitored device, a date of manufacture of the monitored device, a manufacture lot identifier of a component of the monitored device, and a date of manufacture of the component of the monitored device.

10. A program recording medium on which a program is recorded that allows a computer to perform a process characterized by:
 receiving status data representing a status of a monitored device from the monitored device;
 comparing the status data with a condition for prediction that was stored in a condition storing part and includes a condition created based on a change pattern of the status data that provides an indication of an abnormality, the status data being obtained before a point in time at which the abnormality is caused in the monitored device with the status data;
 accumulating the status data received from the monitored device;
 newly creating the condition for prediction based on a transition of the status data before the point in time at which the abnormality is caused, using the status data accumulating in the data storing part, and storing the condition for prediction in the condition storage part; and
 providing to the monitored device a notification that abnormality is predicted when the status data meets either of the newly-created condition for prediction or the condition for prediction prestored in the condition storage part.

* * * * *